United States Patent
Malik

(10) Patent No.: US 7,320,019 B2
(45) Date of Patent: Jan. 15, 2008

(54) METHOD AND APPARATUS FOR AUTOMATICALLY CHECKING E-MAIL ADDRESSES IN OUTGOING E-MAIL COMMUNICATIONS

(75) Inventor: Dale W. Malik, Dunwoody, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 752 days.

(21) Appl. No.: 09/725,717

(22) Filed: Nov. 30, 2000

(65) Prior Publication Data

US 2002/0065891 A1    May 30, 2002

(51) Int. Cl.
    *G06F 15/16*      (2006.01)
(52) U.S. Cl. ...................... 709/206; 709/219
(58) Field of Classification Search ................ 709/227, 709/200, 203–210, 228, 229, 245, 219, 224, 709/225, 248, 223, 202, 218, 213, 217, 221; 358/405, 1.15; 370/352; 379/100, 106; 707/5, 4, 3; 715/758, 744; 713/201; 455/412; 704/270
See application file for complete search history.

(56) References Cited

U.S. PATENT DOCUMENTS

| | | | | |
|---|---|---|---|---|
| 5,115,326 A | * | 5/1992 | Burgess et al. ............. | 358/440 |
| 5,430,719 A | * | 7/1995 | Weisser, Jr. ................. | 370/389 |
| 5,884,033 A | * | 3/1999 | Duvall et al. ............... | 709/206 |
| 5,892,919 A | * | 4/1999 | Nielsen ....................... | 709/228 |
| 5,907,677 A | * | 5/1999 | Glenn et al. ................ | 709/206 |
| 5,943,649 A | * | 8/1999 | Fado et al. .................. | 704/270 |
| 5,944,787 A | * | 8/1999 | Zoken ......................... | 709/206 |
| 5,958,008 A | * | 9/1999 | Pogrebisky et al. ........ | 709/223 |
| 5,991,290 A | * | 11/1999 | Malik ......................... | 370/352 |
| 6,023,464 A | * | 2/2000 | Woundy ..................... | 370/352 |
| 6,026,441 A | * | 2/2000 | Ronen ........................ | 709/227 |
| 6,052,709 A | * | 4/2000 | Paul ........................... | 709/202 |
| 6,055,570 A | * | 4/2000 | Nielsen ....................... | 709/224 |

(Continued)

OTHER PUBLICATIONS

SEDACS-a client/server approach to TPS development; Burrus, P.F.; AUTOTESTCON '95. 'Systems Readiness: Test Technology for the 21st Century'. Conference Record, Aug. 8-10, 1995.*

(Continued)

*Primary Examiner*—Thong Vu
(74) *Attorney, Agent, or Firm*—Thomas, Kayden, Horstemeyer & Risley

(57) ABSTRACT

The present invention provides a system and method for detecting incorrect e-mail addresses in outgoing e-mail communications. In a first embodiment, a domain name database creates a table of domain names by automatically storing the domain names of e-mail addresses from which incoming e-mails are received. When a user creates an outgoing e-mail communication, the system checks the domain names provided by the user with those domain names stored in the table. If the user-provided domain name does not match any of the domain names in the table, or closely resembles a domain name in the table, the user is prompted to confirm the provided e-mail address. In a second embodiment, e-mail addresses are extracted from incoming e-mail communications and stored in a memory in a client computer e-mail communications system. The system checks the memory for the presence of the e-mail addresses provided in outgoing e-mail communications, and generates a prompt when an e-mail address is not present in the memory.

26 Claims, 8 Drawing Sheets

U.S. PATENT DOCUMENTS

| | | | | |
|---|---|---|---|---|
| 6,088,125 | A * | 7/2000 | Okada et al. | 358/405 |
| 6,092,100 | A * | 7/2000 | Berstis et al. | 709/203 |
| 6,097,797 | A * | 8/2000 | Oseto | 379/100.08 |
| 6,154,465 | A * | 11/2000 | Pickett | 370/466 |
| 6,154,738 | A * | 11/2000 | Call | 707/4 |
| 6,157,946 | A * | 12/2000 | Itakura et al. | 709/217 |
| 6,167,435 | A * | 12/2000 | Druckenmiller et al. | 709/206 |
| 6,189,103 | B1 * | 2/2001 | Nevarez et al. | 713/201 |
| 6,212,265 | B1 * | 4/2001 | Duphorne | 379/142.15 |
| 6,256,667 | B1 * | 7/2001 | W.ang.hlander et al. | 709/218 |
| 6,295,526 | B1 * | 9/2001 | Kreiner et al. | 707/2 |
| 6,321,267 | B1 * | 11/2001 | Donaldson | 709/229 |
| 6,324,569 | B1 * | 11/2001 | Ogilvie et al. | 709/206 |
| 6,332,158 | B1 * | 12/2001 | Risley et al. | 709/219 |
| 6,335,966 | B1 * | 1/2002 | Toyoda | 379/100.06 |
| 6,353,448 | B1 * | 3/2002 | Scarborough et al. | 715/744 |
| 6,405,225 | B1 * | 6/2002 | Apfel et al. | 715/526 |
| 6,427,164 | B1 * | 7/2002 | Reilly | 709/206 |
| 6,434,600 | B2 * | 8/2002 | Waite et al. | 709/206 |
| 6,434,601 | B1 * | 8/2002 | Rollins | 709/206 |
| 6,446,115 | B2 * | 9/2002 | Powers | 709/206 |
| 6,449,657 | B2 * | 9/2002 | Stanbach et al. | 709/245 |
| 6,460,074 | B1 * | 10/2002 | Fishkin | 709/206 |
| 6,480,484 | B2 * | 11/2002 | Morton | 370/352 |
| 6,532,489 | B1 * | 3/2003 | Merchant | 709/206 |
| 6,549,944 | B1 * | 4/2003 | Weinberg et al. | 709/224 |
| 6,557,045 | B1 * | 4/2003 | Tsukui et al. | 709/245 |
| 6,560,634 | B1 * | 5/2003 | Broadhurst | 709/203 |
| 6,564,264 | B1 * | 5/2003 | Creswell et al. | 709/245 |
| 6,574,636 | B1 * | 6/2003 | Balon et al. | 707/103 R |
| 6,594,032 | B1 * | 7/2003 | Hiroki et al. | 358/1.15 |
| 6,601,090 | B1 * | 7/2003 | Gurijala et al. | 709/213 |
| 6,603,764 | B1 * | 8/2003 | Epley | 370/395.1 |
| 6,615,238 | B1 * | 9/2003 | Melet et al. | 709/206 |
| 6,629,092 | B1 * | 9/2003 | Berke | 707/3 |
| 6,650,890 | B1 * | 11/2003 | Irlam et al. | 455/412.1 |
| 6,654,787 | B1 * | 11/2003 | Aronson et al. | 709/206 |
| 6,654,789 | B1 * | 11/2003 | Bliss et al. | 709/206 |
| 6,662,228 | B1 * | 12/2003 | Limsico | 709/225 |
| 6,678,727 | B1 * | 1/2004 | Lee et al. | 709/221 |
| 6,680,935 | B1 * | 1/2004 | Kung et al. | 370/352 |
| 6,684,248 | B1 * | 1/2004 | Janacek et al. | 709/225 |
| 6,687,740 | B1 * | 2/2004 | Gough et al. | 709/206 |
| 6,687,746 | B1 * | 2/2004 | Shuster et al. | 709/223 |
| 6,704,787 | B1 * | 3/2004 | Umbreit | 709/229 |
| 6,728,757 | B1 * | 4/2004 | Friend | 709/206 |
| 6,735,617 | B1 * | 5/2004 | Goodman | 709/206 |
| 6,757,274 | B1 * | 6/2004 | Bedingfield et al. | 370/352 |
| 6,760,746 | B1 * | 7/2004 | Schneider | 709/203 |
| 6,782,510 | B1 * | 8/2004 | Gross et al. | 715/533 |
| 6,829,607 | B1 * | 12/2004 | Tafoya et al. | 707/6 |
| 6,829,636 | B1 * | 12/2004 | Kubik et al. | 709/206 |
| 6,836,792 | B1 * | 12/2004 | Chen | 709/220 |
| 6,853,993 | B2 * | 2/2005 | Ortega et al. | 707/5 |
| 6,865,594 | B1 * | 3/2005 | Belissent et al. | 709/206 |
| 6,868,498 | B1 * | 3/2005 | Katsikas | 713/201 |
| 6,880,007 | B1 * | 4/2005 | Gardos et al. | 709/225 |
| 6,895,426 | B1 * | 5/2005 | Cortright et al. | 709/206 |
| 6,925,497 | B1 * | 8/2005 | Vetrivelkumaran et al. | 709/225 |
| 6,963,928 | B1 * | 11/2005 | Bagley et al. | 709/245 |
| 7,028,263 | B2 * | 4/2006 | Maguire | 715/758 |
| 2001/0054115 | A1 * | 12/2001 | Ferguson et al. | 709/248 |
| 2002/0029248 | A1 * | 3/2002 | Cook et al. | 709/206 |
| 2002/0029249 | A1 * | 3/2002 | Campbell et al. | 709/206 |
| 2002/0080938 | A1 * | 6/2002 | Alexander et al. | 379/106.01 |
| 2004/0015584 | A1 * | 1/2004 | Cartmell et al. | 709/225 |
| 2004/0128144 | A1 * | 7/2004 | Johnson et al. | 704/278 |
| 2005/0102395 | A1 * | 5/2005 | Falcon et al. | 709/224 |

OTHER PUBLICATIONS

Computational proofreading of the Croatian lexicon; Dembitz, S.; Sokele, M.; Electrotechnical Conference, 1998. MELECON 98., 9th Mediterranean , vol. 2, May 18-20, 1998.*

Re: Relay real login names only comp.mail.sendmail—Sep. 22, 1998 by Staffan Ulfberg.*

The Connection Control Protocol: Architecture Overview—Schooler (1992) ; ftp.isi.edu/pub/hpcc-papers/mmc/ccp-arch.ps.*

Use is not always what the user says it is in practically any domain, www.cis.ohio-state.edu/~panda/788_sp00/papers/7b_payton_cacm99.pdf.*

The Anti-Spam HOWTO; www.jaffe.com/spam.html.* zone internet—User's Manual—General Features; www.adrr.com/search/manual1.htm.*

Representing IP Information in the X.500 Directory—Johannsen, Mansfield (1993) ftp.inria.fr/doc/networks/osi/x500/osi-ds-38-00.ps.Z.*

Robust Text Processing In Automated Information Retrieval—Strzalkowski (1994) acl.ldc.upenn.edu/W/W93/W93-0302.pdf.*

Agent Server Architecture for the Ajanta Mobile-Agent System—Neeran Kamik (1998) www.cs.umn.edu/Ajanta/papers/pdpta98.ps.*

Building Domain-Specific Search Engines with Machine..—McCallum, Nigam.. (1999) www.cs.cmu.edu/~mccallum/papers/cora-aaaiss98.ps.*

Extracting Japanese Domain and Technical Terms is Relatively Easy—Pascale Fung □□www.cs.columbia.edu/~min/papers/extractingTerms.ps.gz.*

Structural Abstractions of Hypertext Documents for Web-based..—Jitender Deogun □□www.cacs.usl.edu/Departments/CACS/Publications/Raghavan/DSR98.ps.Z.*

InfoHarness: Managing Distributed, Heterogeneous Information—Shah, Sheth (1999) □□lsdis.cs.uga.edu/lib/download/105-InfoHarness.pdf.*

* cited by examiner

| DOMAIN NAME | FIRST RECEIVED | LAST RECEIVED | FREQUENCY FACTOR | RECIPIENTS |
|---|---|---|---|---|
| TOWER | 10/10/99 | 01/05/00 | 5 | M SMITH<br>G TODD |
| MICROPOINT | 09/07/98 | 09/09/00 | 7 | M SMITH<br>A BAGHDAD<br>G BRAD<br>P LAUREN |
| MCCUTCHENSKY | 09/25/00 | 09/25/00 | 2 | B CUPP |
| WITEOUTBIC | 06/10/97 | 06/10/00 | 1 | M MOBLAN |
| GLASSES | 06/09/99 | 10/05/00 | 8 | L GOTTSMITH<br>B BEDNAR<br>D ISAAC<br>G SMITH<br>J ROSS<br>L EISEN |
| ---- | ---- | ---- | ---- | ---- |

*FIG. 4*

METHOD AND APPARATUS FOR AUTOMATICALLY CHECKING E-MAIL ADDRESSES IN OUTGOING E-MAIL COMMUNICATIONS

FIELD OF THE INVENTION

The present invention relates to the transmission of electronic mail over computer networks, and more particularly, to a method and apparatus for checking and confirming that a valid email address is provided in an email communication prior to transmission of the communication.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, or letters, to communicate with others who are in the same office or perhaps in remote locations across the world.

E-mail application programs are typically configured for generating messages in the form of memoranda. An e-mail application user interface guides a user to "compose" an e-mail communication by providing a platform for entering at least one outgoing e-mail address, a "subject" heading, and a "body" for the actual message. The user's return address is automatically provided in the e-mail. The user may also designate a document, file or executable program to be attached to the e-mail message. When the user completes typing the message and presses the "send" key, the message is transmitted over the network and is routed for delivery to an e-mail server corresponding to the provided destination address.

A known e-mail communications system and a method for transmitting email communications between networks over the Internet are described with reference to FIG. 1. Computers 10a-10c are connected through a local area network (LAN) 11 to e-mail communications system 12, which can send e-mail communications to any of computers 18a-18c through e-mail communications system 16 and local area network (LAN) 17. E-mail communications systems 12 and 16 include Mail Transport Agent (MTA) servers 12a, 16a, Post Office Protocol (POP or POP3) servers 12b, 16b, and Message Store 12c, 16c. The e-mail communications servers 12 and 16 are also connected to respective domain name servers (DNS) 13, 15.

When an e-mail communication is transmitted according to the Simple Mail Transport Protocol (SMTP), it is first divided into three components: the "mail from:" address; the recipient address list; and the data portion of the message. After a user of computer 10c prepares an e-mail communication and sends the email across the LAN 11, it is sent to the MTA 12, which accepts e-mails for delivery. The MTA then separates the address information from the data portion of the email. The MTA parses the envelope to determine whether to route the message to an external network or store the message in Message Store 12c for access by another computer connected to the LAN 11. The MTA "postmarks" the e-mail by adding routing data to the header before storing the message.

If the e-mail is to be sent to a another user on a different mail system, the MTA 12 next determines the domain for the intended recipient through the DNS 13, which queries the DNS 15 through the Internet. Upon receiving the domain information, MTA transmits the e-mail communication to the MTA 16b, which is waiting to accept e-mail. The MTA 16b then stores the received e-mail in Message Store 16c. Later, a user on computer 18a logs in to the e-mail system and connects to the POP server 16a, which determines if there is new mail to download. The POP server 16a retrieves the e-mail communication from the Message Store 16c and transmits the e-mail through the LAN 17 to the user.

As is well known, the e-mail address that is supplied by the user must be in a particular format for a successful transmission. The first part of the address is the recipient's username, followed by a "@" sign, and then a hostname or domain name, which identifies where the recipient has an Internet mail account. The rightmost portion of the domain section of the address identifies the kind of organization where the recipient has an address, which, in the United States, is typically one of: ".com", ".edu", ".gov", "org", or ".net". During transmission, this address is translated through a domain name server by Internet Protocol (IP) into an IP address, which is a series of four numbers separated by periods (dots).

In some circumstances, e-mail software will prompt a user when an incorrect e-mail destination address is detected. For example, the software may parse the contents of an e-mail address to check that an "@" character and a domain name are present. If the e-mail address is in the wrong format, the system will prompt the user to provide the correct e-mail address before an attempted transmission. This e-mail format checking capability can conserve network resources, while providing an immediate opportunity for a user to correct and send an e-mail communication.

It is relatively common mistake for a user to forget or misspell a username, hostname, or domain name in an e-mail address for an e-mail communication. If an invalid hostname or domain is provided, the error is detected during transmission by the domain name server. In most circumstances, an error message then generated to be transmitted back to the user. The user will then receive the error message several minutes after having attempted to send the e-mail communication.

If the user exits from the e-mail software or logs off the computer network before receiving the error notification, there may be a substantial delay before the user corrects and re-sends the e-mail communication.

If a user inadvertently provides an invalid username, or an incorrect but valid hostname or domain name, the user may never be notified of the error. The email will be transmitted in the usual course from the user's e-mail server, through the domain name server, and onto the Internet. The e-mail will eventually be routed to another MTA server, which will then determine that the provided username is not registered at that domain name. Although it is conceivable for the MTA server at that domain name to generate and transmit an error message in response, this is uncommon, Even if an error message is generated, it may be upwards of a half hour before this message is forwarded to the sender.

To assist the user in supplying e-mail addresses when creating e-mail communications, many e-mail software applications include an address directory. A user can generate entries by supplying names, addresses, telephone and facsimile numbers, e-mail addresses, and other pertinent information into the table. The user can later refer to the directory when composing an e-mail communication. Some e-mail software applications incorporate an automatic e-mail address generator, which, when the user provides the first few characters of an e-mail address, suggests corresponding e-mail addresses from the list that have been preprogrammed into the directory.

Although the e-mail address directory alleviates some of the above-described difficulties encountered when a user provides an incorrect e-mail address, the directory is only beneficial for those e-mail addresses that the user preprogrammed into the directory. For most users, the majority of outgoing e-mail communications are sent to persons who are not included in the user's address directory. Accordingly, there is a need for a system for automatically generating or checking email addresses to reduce the occurrence of incorrectly addressed e-mail communications.

SUMMARY OF THE INVENTION

In view of the difficulties described above with sending e-mail communications to the correct intended recipient, there is a need for a method and apparatus for automatically checking e-mail addresses provided in outgoing e-mail communications before the e-mail is transmitted over the network and along the Internet.

The present invention provides a system and method for detecting incorrect e-mail addresses in outgoing e-mail communications, and for responding by prompting a user with suggested e-mail addresses. A domain name database in the e-mail communications software creates a table of domain names by automatically storing the domain names of e-mail addresses from which incoming e-mails are received. When a user creates an outgoing e-mail communication, the system checks the domain name provided by the user with those domain names stored in the table. If the user-provided domain name does not match any of the domain names in the table, or closely resembles a domain name in the table, the user is prompted to confirm the provided e-mail address.

The e-mail communications software also tracks the number and frequency by which an e-mail address appears in incoming and outgoing e-mail communications. If an e-mail address is frequently used or received, an entry is automatically generated in a personalized e-mail address directory. The address directory is then used to check the complete e-mail addresses provided in outgoing e-mail communications, and to suggest e-mail addresses when the system detects an incorrect e-mail address.

An object of the invention is to provide a method of automatically checking for an incorrect e-mail address in an outgoing e-mail communication. A list of domain names is stored in a memory. The list of domain names is checked for whether a domain name of the e-mail address is present in the list. A prompt is generated for a user to confirm an e-mail address if the domain name is not included in the list of domain names.

Another object of the invention is to provide a method of automatically checking for misspelled e-mail addresses in outgoing e-mail communications prior to transmission by an e-mail communications server. Domain names in senders' email addresses are extracted from e-mail communications incoming to the email communications server. The extracted domain names are stored in a domain name database. Outgoing e-mail communications are received from client computers connected to the e-mail communications server through a local network. The domain name database is searched for domain names spelled similarly to the domain names in e-mail addresses provided in the outgoing e-mail communications, and an error prompt is generated upon detecting that a domain name in an e-mail address provided in an outgoing e-mail communication is misspelled.

The present invention also provides an e-mail server for automatically checking for misspelled e-mail addresses in outgoing e-mail communications prior to transmission by an e-mail communications server. The server includes an interceptor for extracting domain names from e-mail addresses provided in incoming and outgoing e-mail communications. A domain name database stores domain names extracted from senders' e-mail addresses in incoming e-mail communications. A checker searches the domain name database for domain names spelled similarly to the domain names in e-mail addresses provided in the outgoing e-mail communications, wherein the e-mail server detects misspelled domain names in e-mail addresses in outgoing e-mail communications.

A further object of the invention is to provide a method of automatically checking for an incorrect e-mail address in an outgoing e-mail communication, comprising the steps of storing a list of e-mail addresses in a memory, checking if an e-mail address in the e-mail communication is included in the list of e-mail addresses in the memory, and generating a prompt for a user to confirm an e-mail address if the domain name is not included in the list of e-mail addresses.

Yet another object of the invention is to provide an e-mail communications system stored in a client computer for automatically checking for incorrect e-mail addresses provided in outgoing e-mail communications from the client computer prior to transmission to an e-mail server. An address extractor extracts senders' email addresses from incoming e-mail communications. A memory stores e-mail addresses extracted from senders' e-mail addresses in incoming e-mail communications. A checker searches the memory for e-mail addresses that are provided in outgoing e-mail communications, The checker generates a prompt upon detecting that an e-mail address in an outgoing e-mail communication is not present in the memory.

BRIEF DESCRIPTION OF THE DRAWINGS

FIG. 4 is a table of an exemplary domain name database in the e-mail communications server of FIG. 2.

DETAILED DESCRIPTION OF THE PREFERRED EMBODIMENTS

Figure 1:
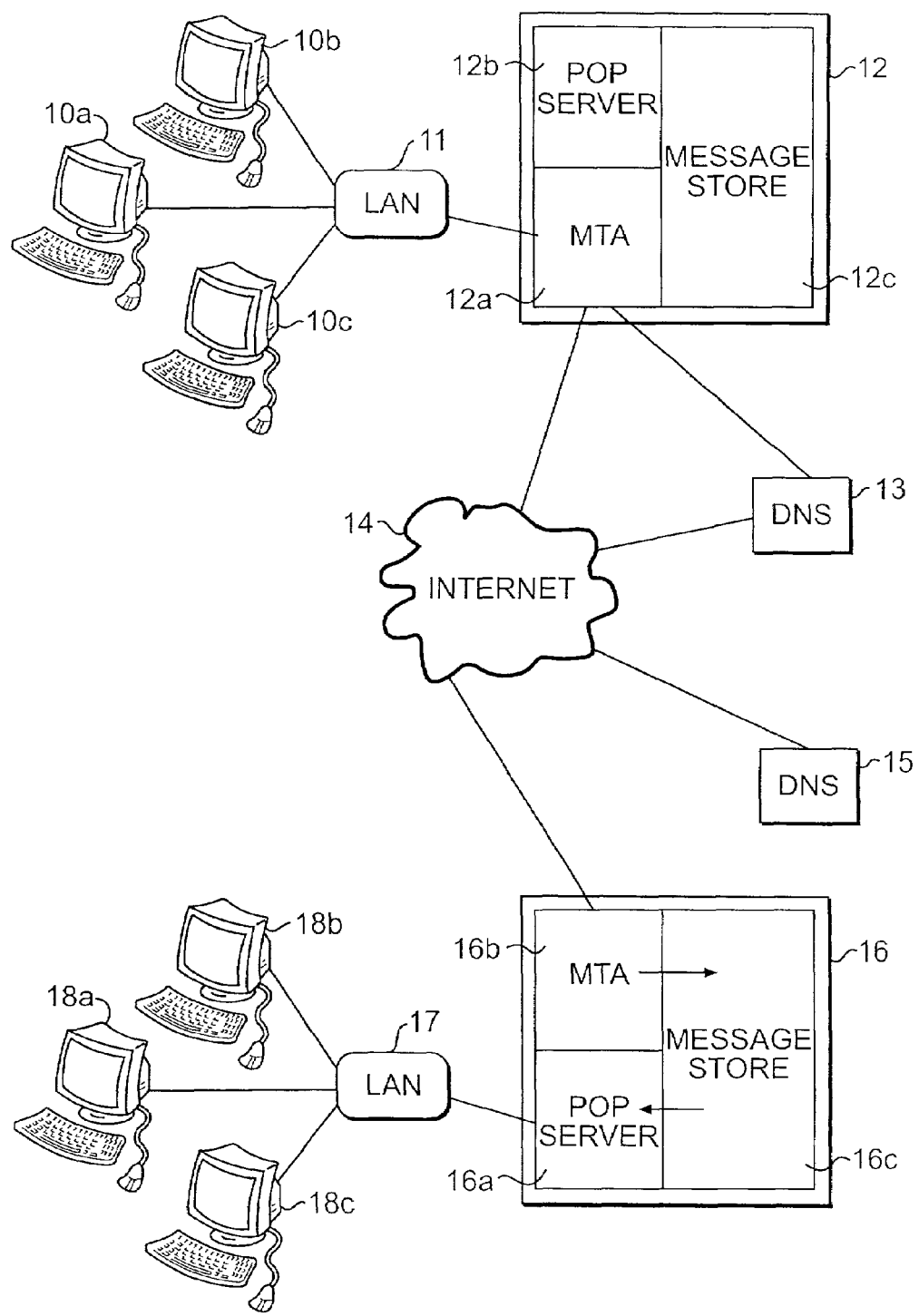
FIG. 1 is a schematic diagram of a known e-mail communications and computer network system.

The present invention will now be described in more detail with reference to the figures. In the e-mail communications system according to the first embodiment of the present invention, as shown in the schematic diagram provided in FIG. 2, the e-mail server includes a domain name store 20, an e-mail header interceptor/parser 21, and a domain name checker 22, in addition to the other contents of a conventional e-mail server. A Message Store 23 stores e-mail messages that are received in the e-mail communications network. MTA server 24 accepts mail or delivery and either holds it for download by a client or passes it to another MTA server for delivery. POP server 25 stores mail received via SMTP until it is read by the user.

When an e-mail communication is received in the MTA 24, e-mail communications software in the e-mail header interceptor/parser 21 scans the sender's e-mail address information, which is forwarded to the domain name checker 22. The checker 22 copies the sender's e-mail address and searches the domain name store 20 for the sender's domain name. If there is no such entry in the domain name database, a new entry is created and stored in the database 20. The checker is preferably implemented as a script file in software.

Figure 3:
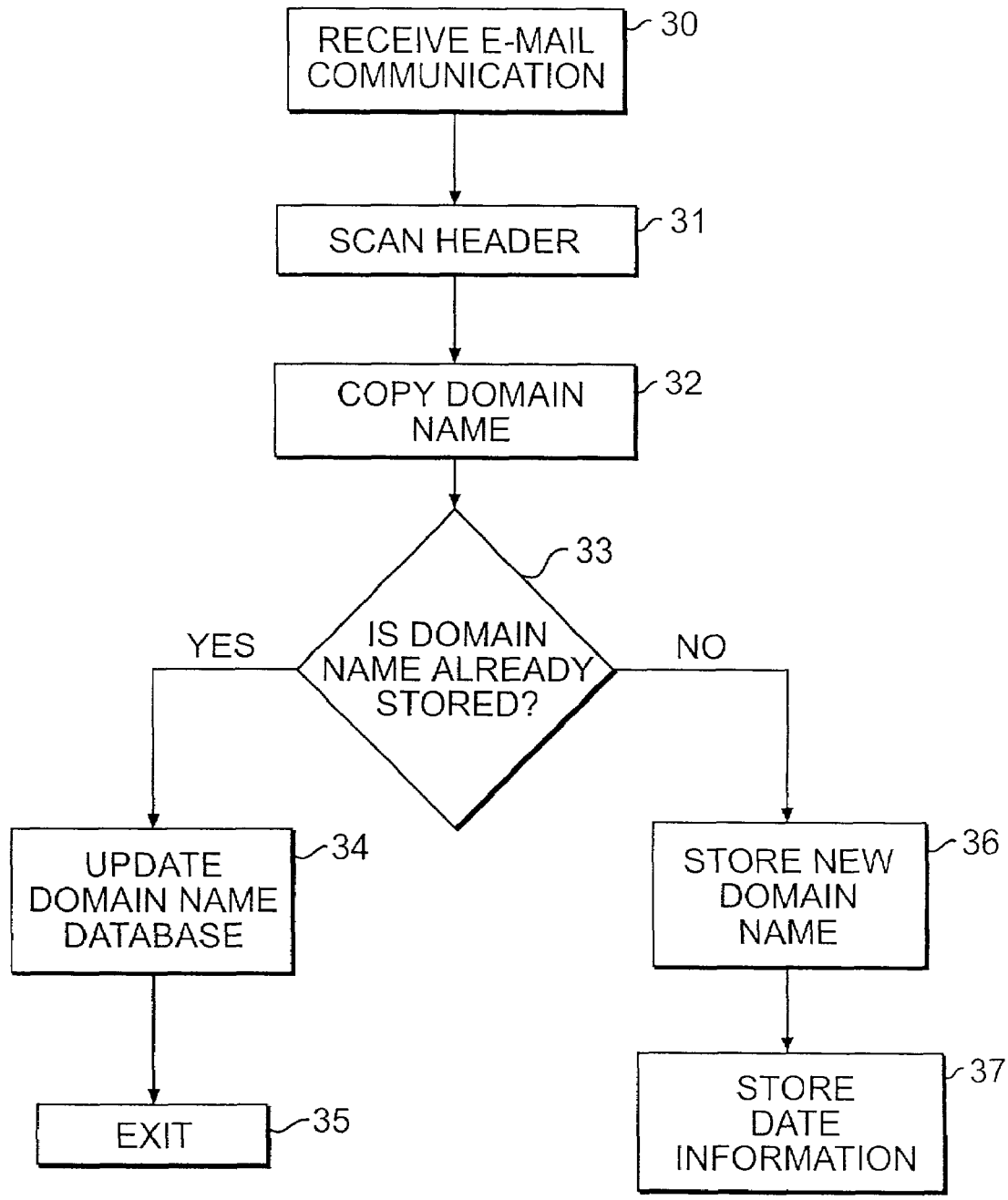
FIG. 3 is a flow diagram for storing domain names in a domain name database in the e-mail communications server of FIG. 2.

The method for populating the domain name database according to the first embodiment of the present invention is now described with reference to FIG. 3. In step 30, an e-mail communication is received and processed in the e-mail server 15. The header of the incoming e-mail message is scanned in step 31, and the domain name address is copied in step 32. The e-mail checker 22 then searches the domain name database 20 in step 33 for the existence of the domain name copied from the incoming e-mail message. If the domain name is already stored in the domain name database, the e-mail checking operation performs any necessary database updating operations in step 34, and quits in step 35. The system may update the database by storing the date that e-mail is received, and by calculating information concerning the frequency by which e-mails having the domain are received.

If the domain name does not currently exist, a new record is created in steps 36-37. To create a new record, the database will first store the newly received domain name in step 36. Corresponding with step 34, the database may also store the date that the record is created, in step 37.

An exemplary domain name store 20 is provided in FIG. 4. The domain name store includes domain names associated with an assortment of corporate e-mail accounts and Internet service providers. If the invention is installed on a corporate e-mail system containing many e-mail accounts, and the accountholders are engaged in a variety of different business activities, there may be a wide assortment of domain names from e-mail communications that are received. As will be described, one accountholder may benefit from the domain name of an e-mail communication that was transmitted to another accountholder.

In addition to storing domain names extracted from addresses of e-mail applications that were received in the e-mail server, the domain name store may also include dates that the domain name in an e-mail address was first and most recently received by the network, and a list that tracks the user names in the internal network who have received e-mail communications for each given domain name. The database may also calculate a "frequency factor" by which e-mail communications are received from an accountholder at the given domain name. The "frequency factor" may be calculated according to the number of times that the domain name has been received over a certain period of time. This calculation can be weighted according to how recently the domain name has been received by the network.

In order to maintain the domain name database at a reasonable size, the e-mail server may be configured to periodically remove domain names from the domain name database that are used only infrequently. For example, a domain name entry may be deleted if none of the listed recipients is presently an accountholder in the network. Domain name entries also may be deleted if the "frequency factor" falls below a threshold value. Although there are several possible methods for maintaining the database size, the e-mail checker will function most effectively if there are no size restrictions for the database.

A method for checking an outgoing e-mail communication according to the first embodiment is now described with reference to FIG. 5. A user first creates a draft e-mail communication in step 50. The e-mail communication includes at least one destination e-mail address, but may also include a subject heading, message, and/or attachment files. When the user attempts to send the e-mail communication, it is transmitted from the user's networked computer along a LAN and is received in the network e-mail server in step 51. The checker now extracts the domain name from the proposed recipient's e-mail address in step 52, and checks the provided domain name in step 53. If the domain name database in the email server contains the provided domain name, the e-mail server processes the email communication according to http protocol in step 54, and forwards the e-mail along the Internet gateway for transmission in step 55.

If the domain name database does not detect the extracted domain name in step 53, the system provides a prompt to the user in step 56. The prompt can occur in several possible formats. For example, the e-mail server may send a network message alert to the sender's personal computer, or may generate and transmit an e-mail message containing the prompt. In either case, the user can then decide in step 57 whether to confirm the e-mail address, correct the e-mail communication, or cancel delivery, in steps 58, 59, and 60, respectively. If the e-mail is confirmed in step 58, it is then processed for transmission in step 54, as described above. The system may then add the confirmed domain name to the domain name database. If the e-mail is corrected, the system will re-extract the domain name in step 52 and repeat the checking operation in step 53 before the e-mail is processed and transmitted.

Figure 2:
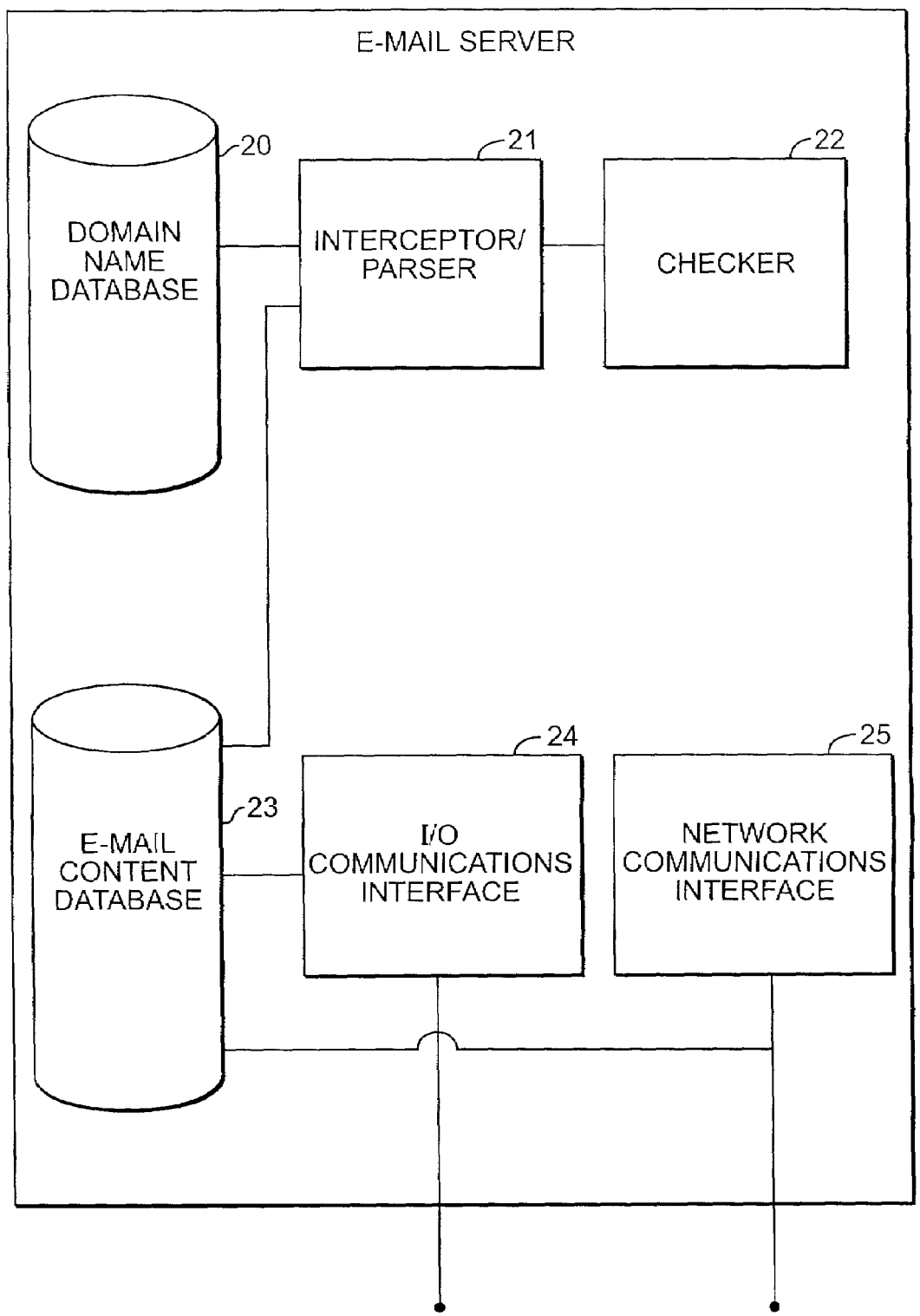
FIG. 2 is a schematic diagram of an e-mail communications server according to a first embodiment of the present invention.
Figure 5:
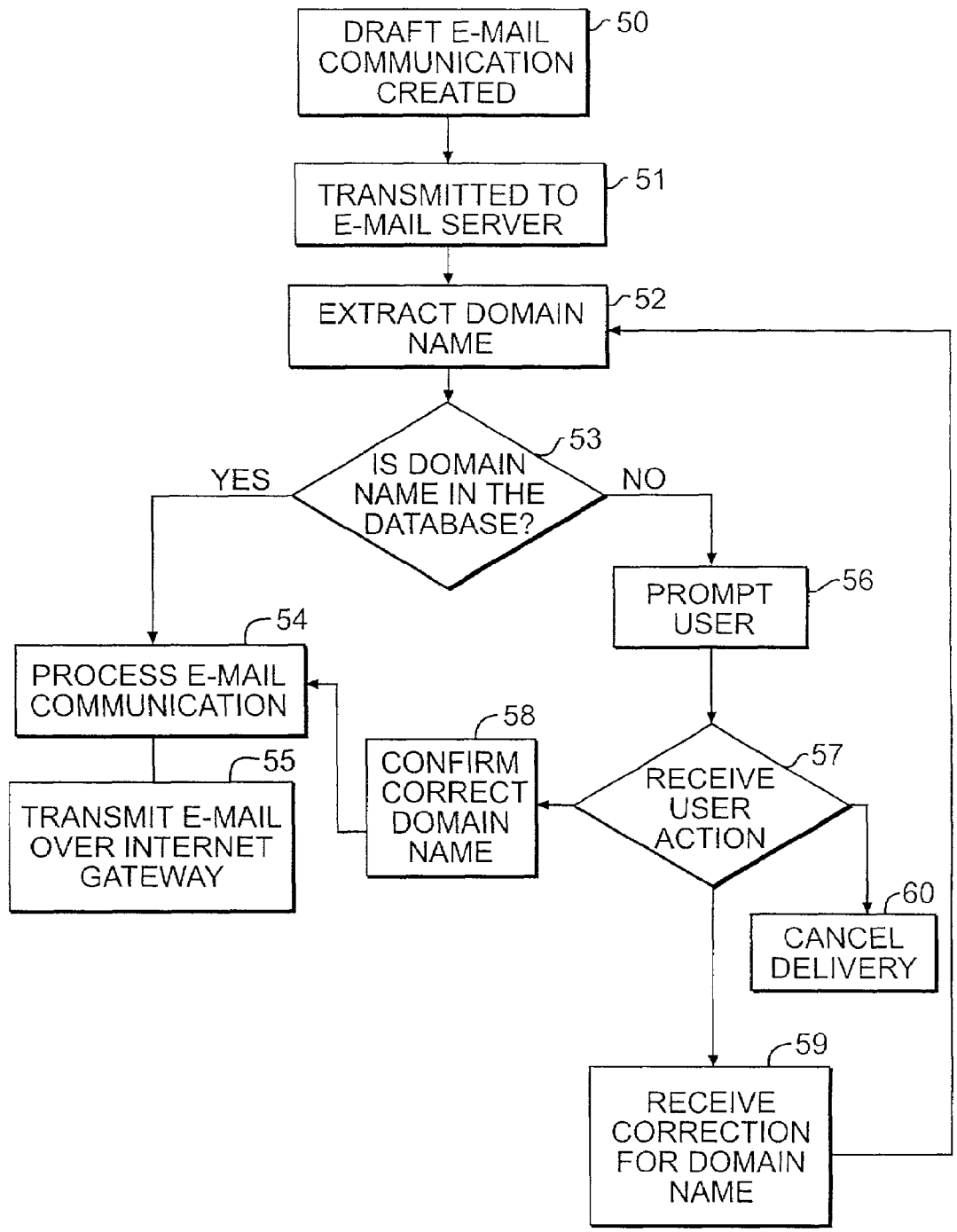
FIG. 5 is a flow diagram for checking domain names in outgoing e-mail communications according to the first embodiment of the present invention.

In the method as described in FIG. 5 for checking an e-mail communication, the e-mail checker 22 of FIG. 2 searches the domain name database only for the domain name extracted from the user's e-mail communication, and generates a prompt when the domain name is not present in the database. As an alternative, the checker can be configured to search for domain names that are spelled similarly to the extracted domain name. In this manner, the checker will perform a pseudo spell-checking operation to detect mistyped domain names. When a user provides an e-mail address with a domain name that is not similar to any domain names in the database, the e-mail server processes the e-mail communication, in the normal manner, without generating a prompt to the user. By only searching for words that are likely to have been mistyped or misspelled, the e-mail checker will cause less distraction for the user. Furthermore, because most e-mail addressing errors result from misspelled or mistyped domain names, this checking algorithm may be equally effective in detecting incorrect or invalid e-mail addresses.

There are numerous methods for detecting whether a user-provided domain name is similar to one or more domain names stored in the domain name database to perform a spell-checking operation. As one example, the e-mail checker can check each alpha-numeric character of the domain names in the database against those in the extracted domain name. The system can then generate a prompt when there is at least one but no more than two discrepancies between a reference domain name and the extracted domain name. The e-mail checker can also remove alpha-numeric characters from the extracted domain name, perhaps one at a time, and search the domain name database for a domain name having at least each of the remaining alpha-numeric characters. These algorithms will likely detect errors that occur when a user misspells a word by inadvertently switching two letters. The e-mail checker can also compare the extracted domain against the reference domain names according to basic grammar rules, as is known in conventional spell-checking software.

In the first embodiment of the present invention, as specifically described with reference to FIGS. 2-5, a domain name is extracted from a user-provided e-mail address and checked in the domain name database of the network e-mail server. By maintaining the domain name database at the e-mail server, as opposed to the client computers, a single domain name database becomes populated with domain names from all incoming e-mail addresses to any of the users in the network. Accordingly, the domain name database can quickly become a directory of those domain names that the users in the network often encounter. The server-side configuration of the e-mail checker and domain name database also saves processing power and storage capacity at the client-side user computers.

Although many e-mail addressing errors occur in the domain name of the email address, addressing errors can also occur from misspelled or mistyped usernames at the beginning of the e-mail address. In the second embodiment of the present invention, which can be utilized separately or in conjunction with the first embodiment, the entire e-mail address is checked in a personalized e-mail address directory. The e-mail address directory, which is preferably stored on the user's client-side computer, can be incorporated into business/personal contact organizer systems that are available in many conventional e-mail communication software packages. Prior to transmitting an e-mail message composed by the user, the email system performs an e-mail address check against the database of e-mail addresses stored in the personalized address directory.

Figure 6:
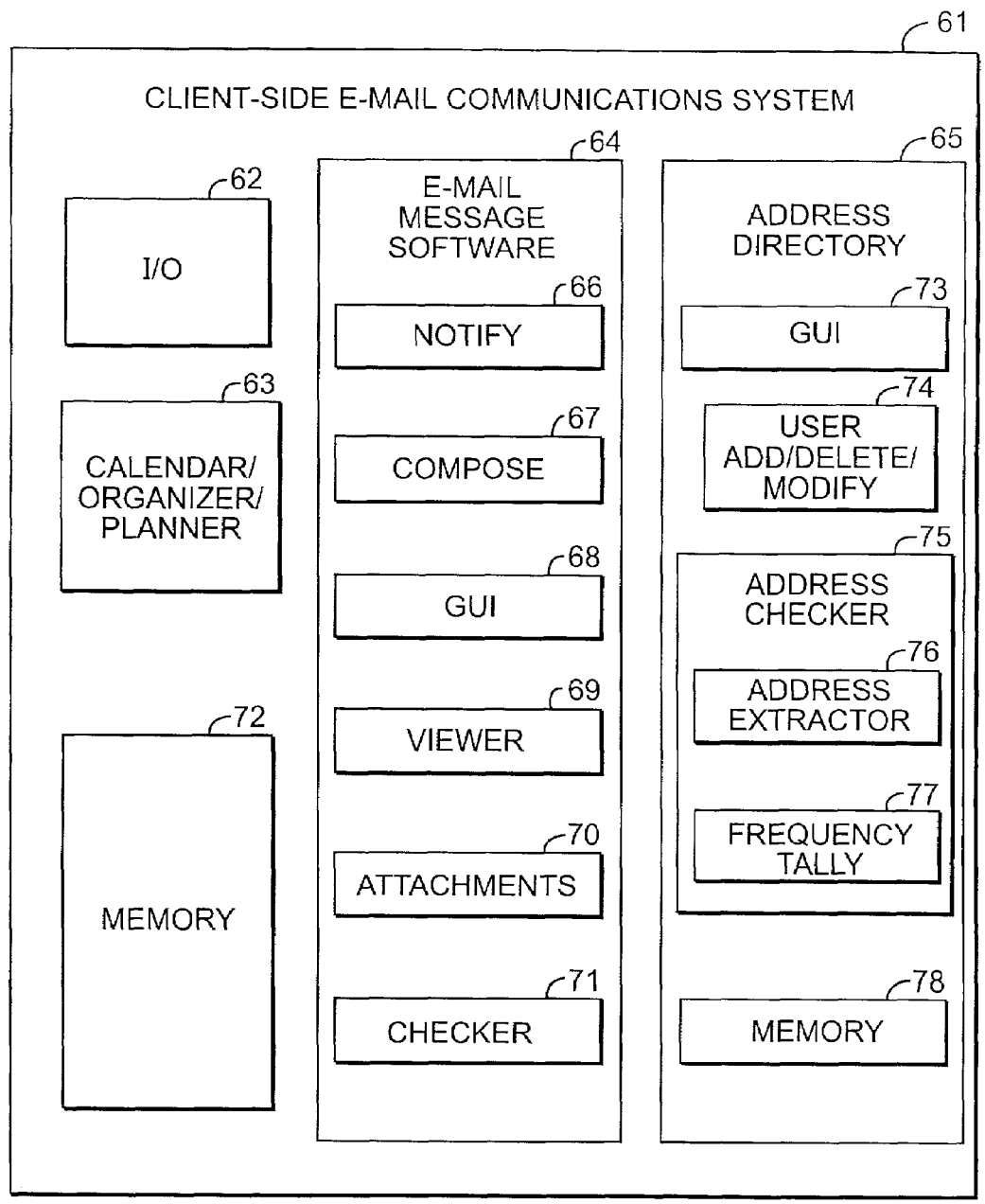
FIG. 6. is a schematic diagram of a client-side e-mail communications system according to a second embodiment of the present invention.

A schematic representation of the client-side e-mail communications personalized address directory and e-mail address checking system is now described with reference to FIG. 6. The client-side e-mail communications system 61 primarily consists of input/output interface 62, memory 72, e-mail messaging software 64, address directory 65, and calendar/organizer 63. The input/output interface 62 connects to the calendar/organizer 63, e-mail messaging software 64, and address directory 65 to facilitate communications with the LAN network and the user's display. As is known in the art, the e-mail messaging software component 64 includes e-mail notification software 66, templates for composing e-mail communications 67, graphical user interface 68, message and attachment viewer software 69, and file attachment software 70. The e-mail messaging software component 64 of the present invention further includes checker software 71 to detect incorrect or invalid e-mail addresses in outgoing e-mail communications, as will be explained in further detail below.

The address directory 65 includes a list of names, addresses, telephone numbers, facsimile numbers, and e-mail addresses of persons whom the user may intend to contact. The directory is logically connected to the e-mail messaging software 64 such that a user can access e-mail address information stored in the directory when composing an e-mail communication. Through a graphical user interface 73 and directory management software 74, the user may personalize the address directory by adding new contact information, which is stored in memory 78. The address directory 65 can also be configured to communicate with other devices to assist with customization and directory maintenance, such as a user's personal digital assistant (PDA) or a business card scanner.

The address directory 65 of the present invention also includes address checker directory software 75 that automatically adds e-mail addresses for storage in memory 78 of address directory 65 for later reference when checking e-mail addresses in the checker 71 of e-mail messaging software 64. When the user receives an e-mail communication, the checker directory software 75 extracts the email address for storage in memory 78. Alternatively, the system may be configured such that the system will first detect whether the user frequently receives e-mail communications from a particular sender before storing the e-mail address.

Figure 7:
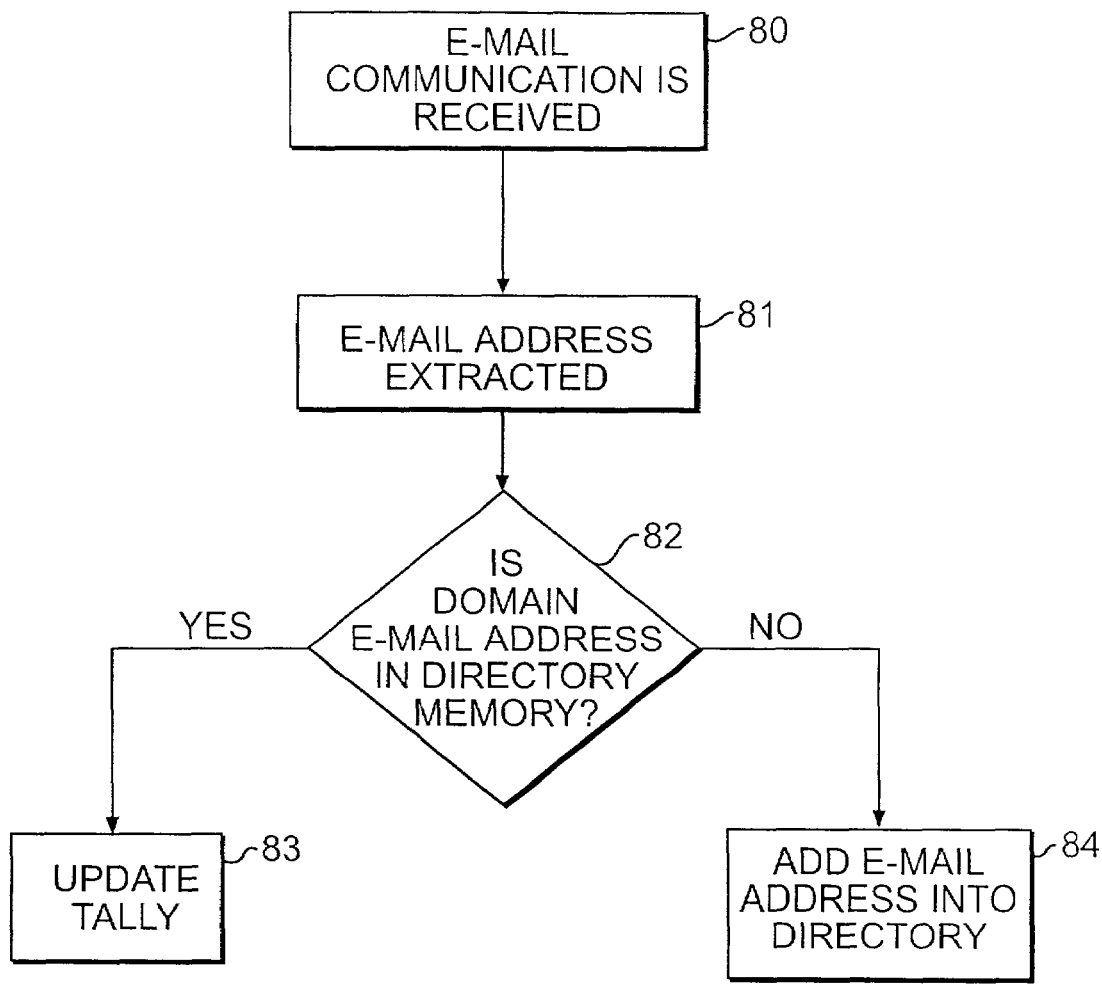
FIG. 7. is a flow diagram for storing e-mail addresses in an address directory in FIG. 6 according to the second embodiment of the present invention.

A method for populating memory 78 with e-mail addresses for e-mail checking is now described with reference to FIG. 7. In step 80, an e-mail communication is received in the user's e-mail messaging software 64. The e-mail address from the received e-mail communication is extracted by address extractor 76 in the checker directory software 75 in step 81. The system searches for the occurrence of the extracted e-mail address in memory 78 in step 82. The e-mail address may have been entered into memory 78 directly by the user via the directory management software 74, or may have been previously added by the address checker software 75. If the e-mail address is present in the memory 78, the frequency tally 77 updates the tally associated with the e-mail address in step 83. In this manner, frequency tally tracks how often the user receives e-mails from certain e-mail addresses. If the e-mail address is not present in the memory 78, the e-mail address is added to the memory 78 in step 84.

Periodically, the system checks whether the frequency tallies associated with the e-mail addresses stored in memory have fallen below a threshold level. If it is determined that the user seldom receives an e-mail communication from any given e-mail address, this e-mail address can then be deleted from memory 78, if necessary, to conserve storage space.

Figure 8:
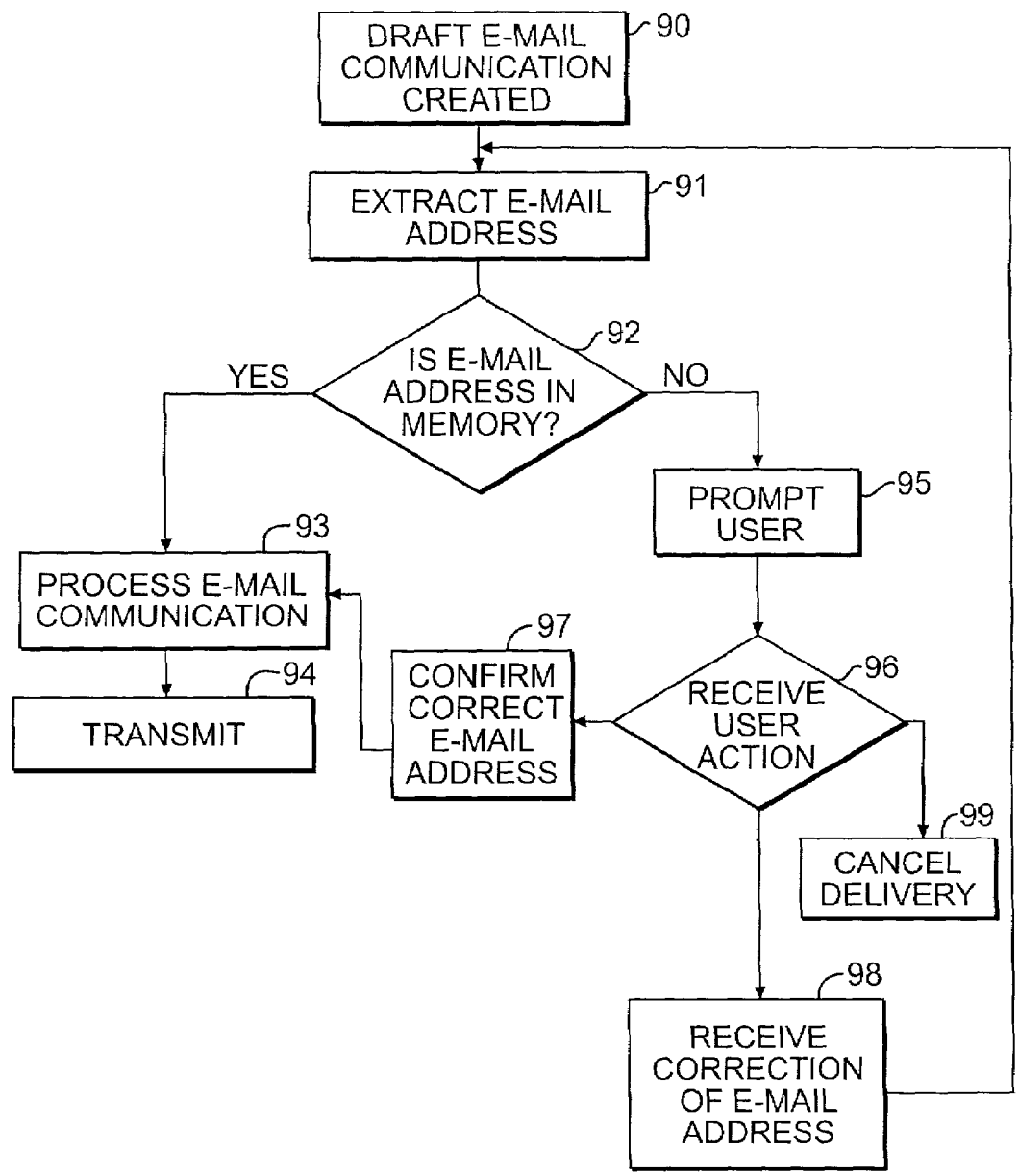
FIG. 8 is a flow diagram for checking e-mail addresses in outgoing e-mail communications according to the second embodiment of the present invention.

A method for checking outgoing e-mail addresses according to the second preferred embodiment is now described with reference to FIG. 8. A user drafts an email communication including an outgoing e-mail address in step 90. In step 91, the e-mail address is extracted from the "to:" field in the e-mail messaging software 64 and is supplied to checker 71. The checker generates a search of the memory 78 in the address directory 65 for the supplied e-mail address in step 92. If the e-mail address is present in the address directory memory, the e-mail messaging software 64 processes the e-mail communication in step 93 and transmits the e-mail to the LAN, the e-mail server, and on to the Internet gateway in step 94.

If the e-mail address is not present in the address directory memory, the checker 71 generates a prompt in step 95. In response to the prompt, the user can either choose in step 96 to confirm the provided e-mail address in step 97, provide a corrected e-mail address in step 98, or cancel delivery of the message in step 99. If the user confirms that the provided e-mail address is correct, the checker then processes the e-mail communication as described with reference to step 93. If the user corrects the e-mail address, the system re-extracts the e-mail address in step 91 and repeats the checking process. This process is repeated for each e-mail address that the user provides in the "to:" and "cc:" fields of the proposed e-mail communication.

The e-mail domain name checker that operates on the e-mail server and the e-mail address checker that operates on user computers can be utilized either individually or in combination. As further alternatives, the domain name checker described with reference to FIGS. 2-5 can be installed within each user computer, and/or the e-mail address checker described with reference to FIGS. 6-9 can be installed on the e-mail server.

Accordingly, the e-mail domain name checker and e-mail address checker can assist the user in minimizing the occurrences of e-mail communications that would otherwise have been incorrectly sent. Thus, it is readily seen that the method and system of the present invention provides for improved and efficient e-mail communications, by detecting incorrect e-mail addresses and prompting the sender to correct the addresses prior to transmission of the e-mail communication.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method of providing a system for automatically checking for an incorrect e-mail address in an outgoing e-mail communication, comprising:
   creating an incoming domain name list in a memory;
   receiving an incoming email communication;
   extracting a domain name from a sender's email address from the incoming email communication;
   storing the domain name in the incoming domain name list in the memory;
   checking if a domain name of an e-mail address associated with an intended recipient of an outgoing e-mail communication is included in the incoming domain name list in the memory;
   checking if a discrepancy exists between a domain name of an e-mail address associated with an intended recipient of an outgoing e-mail communication and a domain name included in the incoming domain name list in the memory by detecting when there is at least one but no more than a maximum number of discrepancies between a domain name in the domain name database and the extracted domain name; and
   transmitting the outgoing email communication if the domain name is included in the incoming domain name list, otherwise generating a prompt for a user to confirm an e-mail address associated with the intended recipient of the outgoing e-mail communication.

2. The method of checking for an incorrect e-mail address according to claim 1, further comprising extracting a domain name from each e-mail address provided in the outgoing e-mail communication, wherein the e-mail communication is transmitted after checking each extracted domain name in the incoming domain name list, and confirming each e-mail address for which the extracted domain name is not included in the incoming domain name list.

3. The method of checking for an incorrect e-mail address according to claim 1, further comprising receiving a corrected e-mail address from the user in response to the prompt; and repeating the checking a corrected domain name and generating a prompt if the corrected domain name is not included in the incoming domain name list, until the user either confirms that the domain name provided in the e-mail address is correct or provides a domain name that is in the list of domain names.

4. The method of checking for an incorrect e-mail address according to claim 1, wherein the outgoing e-mail communication is intercepted in an e-mail server to check the domain name in the e-mail address prior to transmission.

5. The method of checking for an incorrect e-mail address according to claim 4, wherein the prompt is an e-mail message from the e-mail server to the user.

6. The method of checking for an incorrect e-mail address according to claim 4, wherein the prompt is a network message to the user.

7. A method of automatically checking for misspelled e-mail addresses in outgoing e-mail communications prior to transmission by an e-mail communications server, comprising:
   receiving email communications incoming to the email communications server;
   creating a domain name database;
   extracting domain names in sender's e-mail addresses from the e-mail communications incoming to the email communications server;
   storing extracted domain names in the domain name database;
   receiving outgoing e-mail communications from client computers connected to the e-mail communications server through a local network;
   searching the domain name database for domain names spelled similarly to the domain names in e-mail addresses associated with intended recipients of the outgoing e-mail communication provided in the outgoing e-mail communications by detecting when there is at least one but no more than a maximum number of discrepancies between a domain name in the domain name database and the extracted domain name; and
   generating an error prompt upon detecting that a domain name in an e-mail address provided in an outgoing e-mail communication is misspelled.

8. The method of automatically checking for misspelled e-mail addresses in outgoing e-mail communications according to claim 7, wherein searching for similarly spelled domain names is performed by checking each alphanumeric character comprised in the extracted domain name with the alpha-numeric characters comprised in the domain names in the database.

9. The method of automatically checking for misspelled e-mail addresses in outgoing e-mail communications according to claim 7, wherein searching for similarly spelled domain names is performed by removing an alpha-numeric character from the extracted domain name and searching the domain name database for a domain name consisting of at least each of the remaining alphanumeric characters in the extracted domain name.

10. The method of automatically checking for misspelled e-mail addresses in outgoing e-mail communications according to claim 7, wherein searching for similarly spelled domain names is performed by comparing the extracted domain name with reference domain names stored in the domain name database according to predetermined spelling grammar algorithms.

11. The method of automatically checking for misspelled e-mail addresses in outgoing e-mail communications according to claim 7, wherein the error prompt is an e-mail message from the e-mail server to the client computer transmitting the e-mail communication.

12. The method of automatically checking for misspelled e-mail addresses in outgoing e-mail communications according to claim 7, wherein the error prompt is a network message from the e-mail server to the client computer transmitting the e-mail communication.

13. The method of automatically checking for misspelled e-mail addresses in outgoing e-mail communications according to claim 7, further comprising determining whether extracted domain names are already stored in the domain name database, whereby only a single copy of an extracted domain name is stored in the domain name database.

14. The method of automatically checking for misspelled e-mail addresses in outgoing e-mail communications according to claim 13, further comprising storing tally information in the domain name database to tally the frequency in which domain names in the domain name database are extracted from incoming e-mail communications.

15. The method of automatically checking for misspelled e-mail addresses in outgoing e-mail communications according to claim 14, further comprising deleting domain names from the domain name database that are not frequently extracted from incoming e-mail communications according to respective tally information.

16. The method of automatically checking for misspelled e-mail addresses in outgoing e-mail communications according to claim 15, wherein the tally information for each domain name in the domain name database includes the calendar date in which the domain name was most recently extracted.

17. An e-mail server for automatically checking for misspelled e-mail addresses in outgoing e-mail communications prior to transmission by an e-mail communications server, comprising:
 an interceptor for extracting domain names from e-mail addresses provided in incoming and outgoing e-mail communications;
 a database generator for generating a domain name database for storing domain names extracted from sender's e-mail addresses in incoming e-mail communications; and
 a checker for searching the domain name database for domain names spelled similarly to the domain names in e-mail addresses associated with intended recipients of in the outgoing e-mail communications by detecting when there is at least one but no more than a maximum number of discrepancies between a domain name in the domain name database and the extracted domain name,
 wherein the e-mail server prompts the user when it detects misspelled domain names in e-mail addresses in outgoing e-mail communications.

18. The e-mail server for automatically checking for misspelled e-mail addresses in outgoing e-mail communications according to claim 17, further comprising:
 an internal network communications interface for receiving outgoing e-mail communications to be transmitted from client computers and sending incoming e-mail communications to client computers,
 wherein the prompt is transmitted from the internal network communications interface to the client computer requesting transmission of the corresponding outgoing e-mail communication.

19. The e-mail server for automatically checking for misspelled e-mail addresses in outgoing e-mail communications according to claim 18, further comprising:
 an external network communications interface for receiving incoming e-mail communications from an external network and sending outgoing e-mail communications transmitted from client computer connected to the internal network,
 wherein outgoing e-mail communications are transmitted from the external network communications interface to the external network after the checker confirms e-mail address spelling in the outgoing e-mail communications.

20. A method of automatically checking for an incorrect e-mail address in an outgoing e-mail communication, comprising:
 creating an incoming email address list in a memory;
 receiving an incoming email communication;
 storing, in the incoming email address list in the memory, an email address extracted from the incoming email communication;
 checking is an e-mail address associated with an intended recipient of the outgoing e-mail communication is included in the incoming email address list in the memory;
 checking if a discrepancy exists between an e-mail address associated with an intended recipient of the outgoing e-mail communication and an email address included in the incoming email address list in the memory by detecting when there is at least one but no more than a maximum number of discrepancies between an email address in the email address list and the e-mail address associated with an intended recipient of the outgoing e-mail communication; and
 transmitting the outgoing email communication if the e-mail address is included in the incoming email address list, otherwise generating a prompt for a user to confirm an e-mail address if the email address is not included in the incoming email address list.

21. The method of automatically checking for an incorrect e-mail address in an outgoing e-mail communication according to claim 20, further comprising-storing tally information in the memory to tally the frequency by which the e-mail addresses are extracted from incoming e-mail communications.

22. The method of automatically checking for an incorrect e-mail address in an outgoing e-mail communication according to claim 21, further comprising deleting e-mail addresses from the memory that are not frequently extracted from incoming e-mail communications according to respective tally information.

23. The method of automatically checking for an incorrect e-mail address in an outgoing e-mail communication according to claim 20, wherein the memory is in an e-mail address directory in a client computer system.

24. An e-mail communications system stored in a client computer for automatically checking for incorrect e-mail addresses provided in outgoing e-mail communications from the client computer prior to transmission to an e-mail server, comprising:
 an address extractor for extracting sender's e-mail addresses from incoming e-mail communications;

a previous sender addresses memory for storing e-mail addresses extracted from sender's e-mail addresses in incoming e-mail communications;

a checker for searching the previous sender addresses memory for e-mail addresses of intended recipients that are provided in outgoing e-mail communications, and a checker for searching for a discrepancy between a sender address and the previous sender addresses memory for e-mail addresses of intended recipients that are provided in outgoing e-mail communications by detecting when there is at least one but no more than a maximum number of discrepancies between a previous sender address in the previous sender address memory and the email address of an intended recipient, wherein the checker generates a prompt for verification of an e-mail address of an intended recipient upon detecting that an e-mail address of an intended recipient in an outgoing e-mail communication is not present in the previous sender addresses memory.

25. The e-mail communications system stored in a client computer for automatically checking for incorrect e-mail addresses according to claim 24, wherein the previous sender addresses memory is included in an e-mail address directory.

26. The e-mail communications system stored in a client computer for automatically checking for incorrect e-mail addresses according to claim 25, wherein the e-mail address directory additionally stores user-specified e-mail addresses.

* * * * *